Sept. 29, 1936.  L. C. HANSON  2,055,764
CONTROL MECHANISM
Filed Oct. 25, 1930
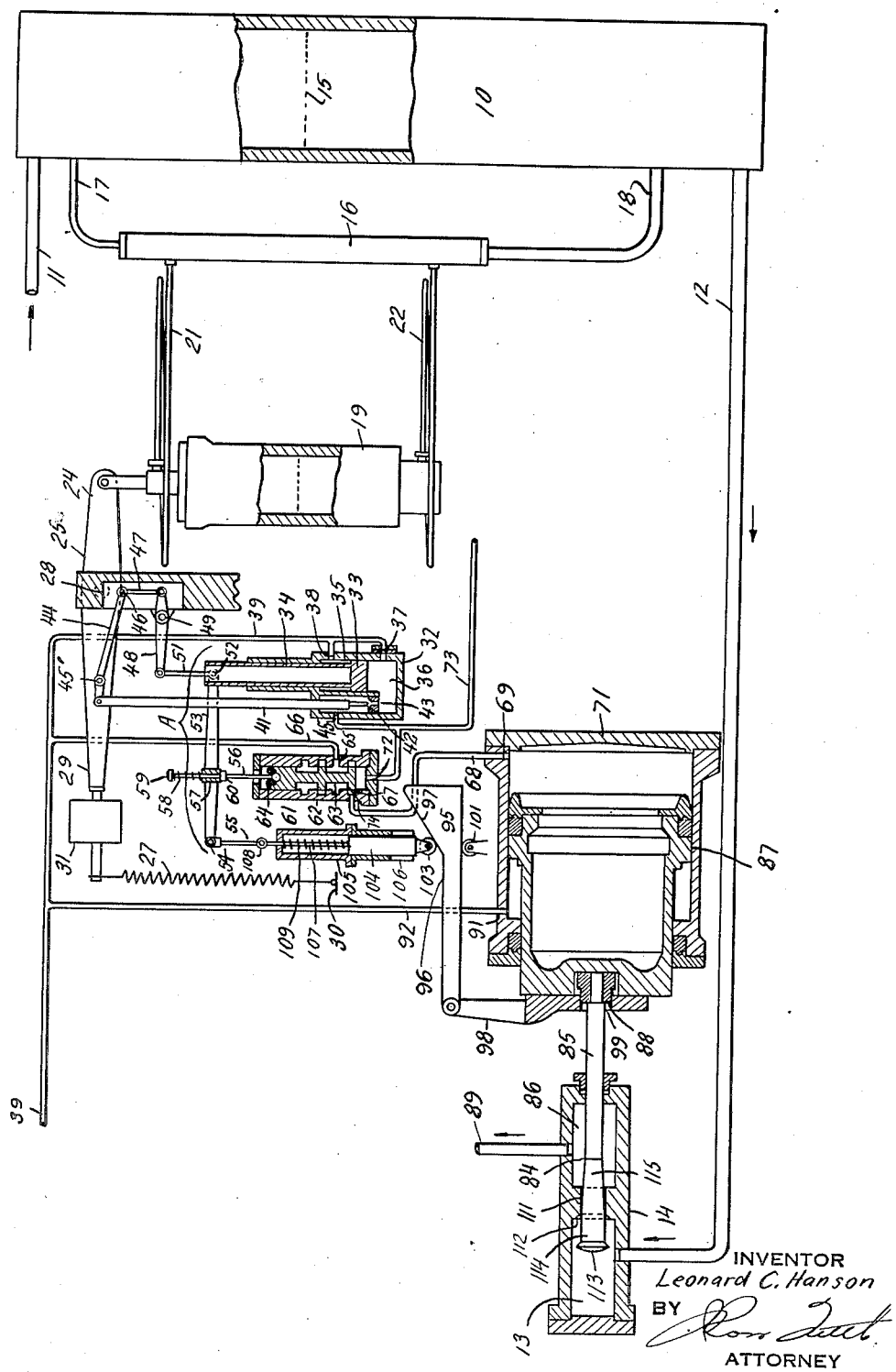
INVENTOR
Leonard C. Hanson
BY
ATTORNEY Patented Sept. 29, 1936

2,055,764

UNITED STATES PATENT OFFICE 2,055,764

CONTROL MECHANISM

Leonard C. Hanson, Colonial Heights, Va., assignor to Atmospheric Nitrogen Corporation, New York, N. Y., a corporation of New York Application October 25, 1930, Serial No. 491,207

3 Claims. (Cl. 137—68)

This invention relates to control apparatus, and more particularly to control apparatus for maintaining the level of liquid in a vessel at a height which varies in proportion to the flow through the vessel. The invention is particularly applicable to apparatus in which rapid fluctuations of liquid level are encountered; such, for example, as scrubbers, coolers and other apparatus employed in the synthesis of ammonia.

One object of this invention is to provide a control apparatus which operates to maintain the liquid level within the vessel at a height which is a function of conditions within the vessel; such as flow, pressure, density and viscosity. In a vessel having an inlet and outlet pipe, a valve in the outlet pipe, a liquid level within the vessel, a liquid of definite density and viscosity flowing into the tower at a specified rate and a definite pressure within the tower, it is evident that to hold the liquid level at a specified height, the valve in the discharge line from the vessel must occupy a definite position; that is to say, the opening through it must have a definite area. Other conditions remaining constant; an increase in the flow into the tower will cause the liquid level to rise, and to stop its rise, the opening of the discharge valve would have to be increased. Other conditions remaining constant; a decrease in pressure would decrease the velocity through the discharge valve; the level would rise, and to stop its rise, the opening through the discharge valve must be increased. Other conditions remaining constant; an increase in density of the liquid would decrease the velocity through the discharge valve, requiring an increase in the opening of the valve to limit the rise in liquid level. Other conditions remaining the same; an increase in viscosity of the liquid would reduce the velocity through the discharge valve and require additional opening of the valve to stop the rise in liquid level. Changes in any of the above conditions in a contrary sense would cause a lowering of the liquid level and would require a closing of the valve to stop its flow. Hence, it is evident that the position of the valve controlling the flow from the tower is a function of conditions within the tower. For a rise of liquid level in the vessel or tower, the control functions to increase the discharge opening and to bring the control responsive elements into equilibrium with a new increased level of liquid in the tower and a new increased discharge from the tower. Conversely, when the liquid level falls, the control functions to diminish the discharge opening and to bring the responsive elements of the control into equilibrium with the lower level of liquid in the tower and the reduced discharge from the tower. No attempt is made to restore the liquid level in the vessel to its original point, but instead, the control functions to bring the control responsive elements into equilibrium with each new level in the vessel and with a corresponding discharge therefrom. Hence, this control is particularly applicable to vessels in which rapid fluctuations of level are encountered since the control responsive elements are sensitive to each succeeding fluctuation and cause an increase or decrease in the discharge, depending on whether the level rises or falls, respectively. Other objects and advantages of this invention will appear from the following detailed description.

The invention comprehends the process for controlling liquid level within a vessel, which involves maintaining the level at a height which varies proportionally to the flow through said vessel by increasing the flow as the level rises and decreasing the flow as the level falls.

The preferred embodiment of this invention is designed to maintain the liquid level in a vessel under pressure, into and from which liquid is continuously introduced and discharged at a height which is not fixed but which varies with the flow through the vessel, preferably by adjusting the flow through the discharge valve in the discharge line of the vessel. Obviously, however, the control may be used to regulate the flow into a vessel as well as to control the flow out of the vessel.

The control may involve a weigh bottle responsive to changes in liquid level within the vessel, the weigh bottle being suspended from one end of a balance beam. Variations of liquid level in the vessel cause corresponding variations of level in the bottle, consequently increasing or diminishing the effective weight of the bottle, and thus rocking the end of the balance beam carrying the bottle either upwardly or downwardly. The movement of the balance beam controls the operation of a relay needle which regulates the movement of a relay piston, in turn governing the operation of a motor capable of exerting the necessary force for operating the valve in the discharge line. A spring connected to the balance beam opposes the forces exerted by the weigh bottle. Also, suitable linkage connects the relay piston with the relay needle so that the piston, in its movement caused by the relay needle, restores the needle to its original position and thus brings the mechanism into equilibrium in a new position corresponding to the changed flow through the discharge valve and the new level in the vessel, as will be more fully described hereinafter.

In the accompanying drawing forming a part of this specification and showing, for purposes of exemplification, a preferred form of this invention without limiting the claimed invention to such illustrative instance, the single figure is a somewhat diagrammatic view, partly in section, of a control apparatus embodying the present invention.

In the preferred form illustrated in the drawing, the invention is shown incorporated in control apparatus for maintaining a level of liquid which varies proportionally to the flow through a vessel subjected to high pressure, and the present description will be confined to the present illustrated embodiment of the invention in such control apparatus. It will be noted, however, that the novel features and improvements are susceptible to other applications, and hence, the scope of this invention is not confined to the improvement herein described.

In the drawing, 10 indicates the scrubbing tower or other vessel having an inlet line 11 through which liquid under pressure, or a mixture of liquid and gas under pressure, passes into the vessel 10. The discharge line 12 leads to the high pressure side 13 of valve 14, which controls the flow from the vessel. The valve 14 will be hereinafter more fully described, and for further disclosure of the structure of the valve, reference may be had to copending application Serial No. 484,259, filed September 25, 1930. If the apparatus is used to control the flow into the vessel, the valve 14 will, of course, be placed in the inlet line.

Dotted line 15 in vessel 10 indicates the height of the level of liquid with which the control apparatus shown in the drawing is in equilibrium. Adapter column 16 has its top connected by tube 17 with the top of the tower or vessel 10 and its base connected by tube 18 with the base of the tower or vessel 10 so that the level of liquid in the adapter column is the same as in vessel 10. The adapter column provides an indirect connection between weigh bottle 19 and tower or vessel 10. If desired, direct connections between the weigh bottle and the gas and liquid spaces in the vessel may be utilized.

The weigh bottle 19, preferably in the form of a cylinder, has its top connected by flexible tube 21 with the top of the adapter column 16 and its base connected by flexible tube 22 with the liquid space in the column 16. Hence, the level of liquid within the weigh bottle is the same as in the adapter column 16 and in the vessel 10. Weigh bottle 19 is pivoted to one end 24 of balance beam 25. The balance beam is fulcrumed on suitable bearings (not shown), the fulcrum point being indicated by the reference numeral 28. End 29 of the balance beam is provided with an adjustable counterweight 31 and a spring 27 has one end secured to end 29 of the balance beam and the other end fastened to a suitable support indicated at 30. The spring 27 opposes the forces, i. e., increase or decrease in the effective weight of the bottle, exerted by the bottle on end 24 of the balance beam. Variations of liquid level in the vessel 10, it will be noted, cause corresponding variations of level in bottle 19, consequently increasing or diminishing the effective weight of the bottle and thus rocking end 29 of the balance beam either upwardly or downwardly against the tension of the spring 27, which maintains the balance beam in its new condition of equilibrium with each change in the effective weight of the bottle 19.

The relay, indicated generally by the reference character A, comprises a relay housing 32 having stepped piston 33—34 therein, the stepped piston being made up of piston 33 and hollow rod 34. The area of the upper surface of the piston 33 bears a definite ratio to the area of the lower surface, preferably it is about one-half the area of the lower surface. The piston 33 remains stationary within the housing 32 only when the pressure of fluid in chamber 35 above the piston 33 bears a definite ratio to the pressure in chamber 36 below the piston 33, depending on the ratio between the areas of the upper and lower surfaces of the piston 33. Chambers 35 and 36 are supplied with pressure fluid, preferably oil, through inlet pipe 38 and inlet orifice 37 respectively, both communicating with the pressure fluid supply line 39.

The inlet orifice 37 is preferably made approximately one-half the area of the outlet orifice 43 hereinafter described. A drop in pressure of the pressure fluid, oil, entering chamber 36 takes place due to its flow through the inlet orifice 37, the drop in pressure varying as the square of the flow. The pressure within the chamber 36 is controlled by relay needle 41. The conical pointed end 42 of this needle regulates the discharge through orifice 43 of the chamber 36. With the needle in a definite position with respect to the discharge orifice, in the embodiment herein disclosed, so that the area of the discharge orifice is approximately equal to the area of the inlet orifice, the upward and downward forces on the piston are in equilibrium and the piston 33 remains stationary at a definite point in the relay housing between the top and bottom thereof. Movement of the needle 41 away from this definite position in a downward direction causes end 42 to diminish the discharge through orifice 43, and accordingly, pressure builds up in chamber 36 with consequent upward movement of piston 33 since the equilibrium between upward and downward forces acting on the piston has been disturbed by the movement of the relay needle. As soon as the equilibrium between forces above and below the stepped piston 33 is restored, the piston stops moving. Conversely, upward movement of relay needle 41 by the upward rocking of end 29 of the balance beam away from the aforesaid definite position causes an increase in the escape of pressure fluid through orifice 43 with descent of the piston 33.

The relay needle 41 is pivoted to one end of a lever 44 pivoted at 45' to the balance beam 25. The other end of lever 44 is pivotally connected at 46 with one end of a link 47, the other end of which is secured to one end of lever 48 pivoted at 49 to the standard carrying the balance beam 25. It is important to note that the pivot point 46 is directly beneath the fulcrum 28. This permits rocking of the balance beam due to changes in the effective weight of the bottle 19, with corresponding changes in the position of the relay needle, without changing the vertical position of point 46, as will be more fully explained hereinafter. Lever 48 is pivoted to one end of link 51, the other end of which is suitably pivoted to the top of the piston stem 34.

Pivoted to the body of the piston rod 34, as indicated at 52, is one end of a floating lever 53. The other end of this lever is pivoted, as indicated by the numeral 54, to the top of the follower 55. A valve stem 56 is associated with an intermediate point on the floating lever. The stem 56 passes through a block 57 integral with, or secured to, the lever 53. The spring 58 is coiled about the stem 56, one end bears against block 57 and the other end bears against head 59 of the stem 56. A collar 60 on the stem 56 contacts with the block 57 when it is moved downwardly, imparting this downward motion to the stem 56. A relay or pilot valve 61 involves the usual housing 62 in which valve spool 63 is slidably mounted. Stem 56 is connected with the spool 63 through the ball joint 64.

The relay valve 61 is formed with a pressure fluid inlet port 65 communicating with the pressure fluid supply line 66 in turn connected with pressure fluid pipe 39. Port 67 in the valve housing 62 communicates through pipe line 68 with port 69 in the servo-motor 71. A drain port 72 in the base of the relay valve communicates with the drain line 73 into which pressure fluid from the discharge orifice 45 also drains. Flange 74 on the valve spool is of an extent sufficient to close the valve port 67, as indicated in the drawing. Movement of the valve spool downwardly places ports 65 and 67 into communication, resulting in flow of pressure fluid from pipe 66 into ports 65 and 67, through pipe 68, into port 69 to servo-motor 71. Movement of the valve spool 63 in an upward direction places port 67 into communication with exhaust port 72 and causes exhaust of pressure fluid from servo-motor 71 into port 69, pipe 68, and ports 67 and 72 into drain pipe 73.

Movement of the valve spool 63 is effected through stem 56 and the floating lever 53, which is in turn moved by the piston rod 34. Thus, when the stem 34 moves up, it rocks the floating lever 53 about the pivot point 54, and through spring 58, pulls up on stem 56, causing the stem and connected valve spool 63 to move in an upward direction. When the piston rod 34 descends, it causes downward rocking of lever 53 about the pivot point 54, moving stem 56 and the connected valve spool 63 downwardly through contact of block 57 with collar 60. As above indicated, movement of the piston rod 34 up or down is caused by changes of liquid level in vessel 10 and weigh bottle 19, which move the relay needle 41 to vary the pressure in chamber 36 below the piston 33.

The servo-motor 71 is of sufficient size to exert the necessary forces for moving the valve stem 84 in the valve 14 against the high pressure occurring in chamber 13 of the valve through which liquid from vessel 10 flows into the low pressure chamber 86. The valve stem 84 is preferably made integral with rod 85, which extends through the low pressure chamber 86 and is suitably secured, as indicated at 88, to the stepped piston 87 within servo-motor 71. Discharge line 89 leads from the low pressure chamber 86 of the valve to a suitable point of disposal for the liquid flowing from the vessel 10.

Oil is supplied at constant pressure to the small end of the stepped piston 87 of the servo-motor through inlet port 91 and pipe 92, which communicates with the supply line 39. The oil pressure on the small end of the stepped piston functions to return the piston when oil is exhausted from the large end. Admission of pressure fluid to the large end of the servo-motor through port 69 causes the servo-motor piston to move to the left as viewed in the drawing, increasing the extent of opening of valve 14 and consequently increasing the flow through this valve. Contrariwise, the exhaust of pressure fluid from the large end of the servo-motor through port 69 permits the oil pressure on the small end of the stepped piston 87 to force it to the right, diminishing the extent of the valve opening with consequent decrease in flow from vessel 10 through valve 14 into the discharge line 89.

The restoring or compensating mechanism associating the servo-motor 71 with the relay A, to prevent over-travel of the valve stem 84 and further to prevent hunting within the system, will now be described. The restoring mechanism involves a cam 95 having a horizontal surface 96 and an upwardly inclined surface 97. The cam is secured to bracket 98, suitably fastened to stepped piston at 99, so that the bracket 98 and connected cam 95 reciprocate with the piston 87. Guide roll 101 provides a guide and support for the reciprocating cam 95. A cam roller 103, carried by the cylindrical stem 104 slidably guided in housing 105, rides on the cam 95. The base of housing 105 is provided with vertical slots 106, permitting movement of the inclined portion 97 of the cam therethrough. A rod 107, integral therewith or suitably secured to follower 104, extends therefrom and is pivoted, as indicated at 108, to the cam rod stem 55. Spring 109, coiled about stem 107, contacts with the top interior of housing 105 and with the cylindrical stem 104 and functions to hold the cam roller 103 into engagement with the cam. Movement of the stepped piston toward the left from the piston indicated on the drawing, occasioned by the valve spool 63 being lowered, causes pressure fluid to flow through ports 65, 67 and 69 into the servo-motor. The stepped piston 87 therefore moves toward the left, cam 95 moving therewith, and consequently cam roller 103 rides up on the inclined surface 97, causing elevation of stems 104, 107 and 55, raising the floating lever 53 about pivot point 52, restoring the valve spool 63 to its original position. Thus, further introduction of pressure fluid into the servo-motor is prevented, consequently avoiding over-travel of the valve stem 84 and hunting within the system. The converse of the above operations takes place when the stepped piston is moved to the right.

The valve seat and stem and the shape of the cam 95 is designed, as shown in the drawing, to prevent wire drawing in the valve 14 and to insure prompt opening of the valve from closed position with gradual movement of the valve once it is opened. The valve seat is formed with a cylindrical portion, indicated at 111, and is provided with a conical seating portion 112. Valve stem 84 comprises a conical seating portion 113 adapted to register with the seat 112, a cylindrical closing or seating portion 114 of substantially the same diameter as 111 and arranged to seat within 111, and a truncated conical portion 115 in line with and extending from the portion 114. Assuming the valve is in seated position, it will be noted that the high pressure within chamber 13 acts upon the stem and maintains it tightly seated. When the valve stem is moved towards the left, the valve remains closed until the seated portion 114 is removed from seat 111, and thus flow through the valve is prevented during the initial opening movement. Continued movement of the stem causes cylindrical portion 114 to leave its seat 111, permitting flow through the valve; hence, wire drawing does not occur on the seating portions 112 and 113 but are exerted upon the end of cylindrical portion 114, remote from the seating portion 113.

To permit prompt opening from closed position, the cam 95 is designed with the horizontal surface 96. With the valve stem 84 in seated position, cam roll 103 rests on the surface 96. Initial movement of the stepped piston 87 with consequent movement of cam 95 causes no movement of the cam stem 104 due to the fact that the cam does not cause an upward movement of the roller 103. Consequently, the floating lever 53 and the valve spool 63 are not restored; hence, permitting continued flow of pressure fluid into the servo-motor and an initial rapid opening movement of the valve 14. Once the valve is opened, the position of the parts is as shown on the drawing, cam roller 103 resting on the base of the inclined portion of track 97. Further movement to the left of the servo-motor piston causes the restoring mechanism to operate to prevent over-travel of the valve stem 84.

It will be noted that any motion of the relay piston stem 34 is followed by a corresponding motion of the servo-motor piston 117, and that for each position of the relay piston stem 34, there is a corresponding position of the servo-motor piston 87, and consequently, a corresponding opening of the valve 14.

In operation, assume that all of the parts of the control apparatus are in equilibrium, as indicated in the drawing, with a certain flow through the discharge valve, and that oil pressure is being supplied through pressure line 39, and further assume that the flow into vessel 10 is increased, this will cause the liquid level to rise in vessel 10, adapter column 16, and weigh bottle 19, increasing the effective weight of the weigh bottle. It will accordingly descend, causing end 24 of the balance beam to descend about fulcrum 28 and end 29 to ascend about this fulcrum point, slightly stretching the spring 27, the increased tension of the spring opposing the increased weight of the bottle. Pivot point 45' of the lever 24 ascends with the balance beam, causing elevation of the relay needle 41, permitting oil to escape faster through discharge orifice 43 with consequent diminution of the pressure in chamber 36. Since pivot point 46 is directly beneath the fulcrum point 28 in the balance beam, there is no relative motion between lever 44 and balance beam 25. The only movement imparted to point 46 by the movement of the balance beam is a slight sidewise motion which is of no consequence.

Due to decrease of pressure in chamber 36, the piston 33 and piston stem 34 descend, pulling down the floating lever 53 about the pivot point 54. This moves the valve spool 63 downwardly, causing port 65 to communicate with port 67.

Pressure fluid flows through ports 65 and 67 from the pressure supply line 39 into pipe 68, port 69 into the servo-motor 71, causing the servo-motor piston 87 to move towards the left and increase the extent of opening of valve 14, hence increasing the discharge from the vessel 10.

Movement of piston 34 downwardly also causes rod 51 to pull down on pivoted lever 48, which exerts an upward thrust through connecting link 47 on the lever 44, turning this lever about point 45', which movement restores the relay needle. Restoration of the needle brings the pressure in chambers 36 and 35 into equilibrium, which causes the piston to rest in its new position in equilibrium with the increased level of liquid in the tower or vessel 10, and the increased discharge from the tower, and consequently with the new flow of liquid through the tower.

Upon a further increase in level in the tower 10, the operations above described are repeated. The converse of the above operations takes place when the level within the vessel falls. Hence, throughout the operation of the control, it functions to maintain the level in the vessel at a height proportional to the flow through the vessel.

The invention as hereinabove described is embodied in a particular form of construction, but it may be variously embodied within the scope of the following claims.

I claim:

1. Control apparatus comprising in combination, a relay including a piston and a relay needle, links connecting said piston with said relay needle and arranged to return the needle to its original position after each impulse imparted to said needle and means actuated by said relay for effecting control of that which is to be controlled.

2. Control apparatus comprising in combination, a pressure fluid relay housing having a discharge orifice, a relay needle arranged to control the extent of said discharge orifice, a piston within said relay housing and links connecting said piston with said relay needle and arranged to return the needle to its original position after each impulse imparted to said needle.

3. Control apparatus comprising in combination, a pressure fluid relay housing having a discharge orifice, a relay needle arranged to control the extent of said discharge orifice and thereby regulate the pressure within said pressure fluid relay housing, a stepped piston in said housing arranged to be actuated by the pressure fluid within said housing and links connecting said stepped piston with said relay needle and arranged to return the needle to its original position after each impulse imparted to said needle.

LEONARD C. HANSON.